Patented Sept. 6, 1932

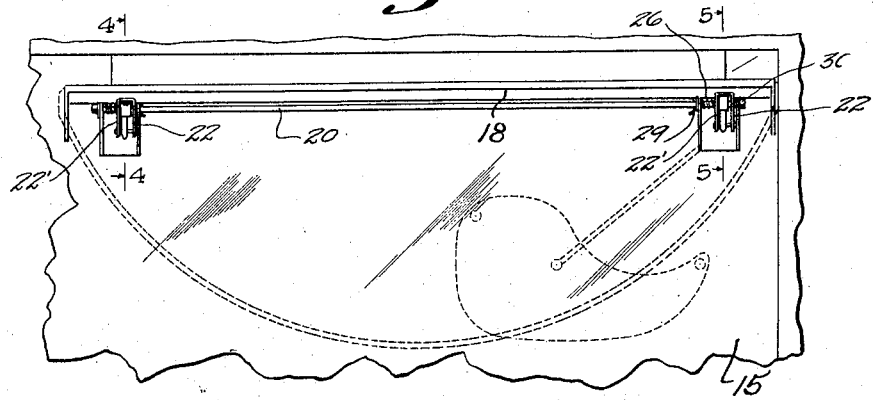

1,876,434

UNITED STATES PATENT OFFICE

FRANCIS J. SCHMIDT, JR., AND CHARLES J. NASH, OF WAUWATOSA, WISCONSIN

VISOR ATTACHMENT FOR WINDSHIELDS OF MOTOR DRIVEN VEHICLES

Application filed October 1, 1928. Serial No. 309,450.

This invention relates to improvements in visor attachments for windshields of motor driven vehicles.

Objects of the invention are:

To provide simple, inexpensive, non-rattling and efficient means for protecting a portion of the windshield from rain, snow, and the glare from the head lamps of approaching vehicles, whereby a clear view of the roadway may be maintained for the driver of a motor vehicle under all conditions;

To provide improved means for connecting a visor and associated glare excluding devices and anti-frost devices to the windshield;

To provide improved means for adjusting such devices and in general to provide satisfactory, commercially available means for maintaining clear vision for the driver of a motor driven vehicle.

In the drawing:

Figure 1 is an elevation of a left-hand fragment of a windshield as seen from in front of the vehicle, showing the attachment applied thereto;

Figure 2 is a reverse elevation showing the same as it appears from the point of view of the driver of the vehicle;

Figure 3 is a sectional view taken on line 3—3 of Fig. 2;

Figure 4 is a sectional view taken on line 4—4 of Fig. 1;

Figure 5 is a fragmentary sectional view taken on line 5—5 of Fig. 1.

Like parts are identified by the same reference characters throughout the several views.

A pair of visor supporting brackets 10 is secured to the windshield 15 by tubular clamping bolts 11 having interior wing nuts 12 and an exterior clamping head 13. Suitable resilient packing 14 is applied to the inner and outer surfaces of the windshield about the apertures through which the bolts 11 pass.

Each of the brackets 10 includes a pair of forwardly and upwardly projecting arms which support a visor shield 18 having connector brackets 19 pivoted to the arms of the brackets 10 by a rod 20, suitable spacing sleeves 21 being preferably employed. This pivotal connection allows the visor 18 to be swung to various positions of inclination from the horizontal position in which it is shown in Figure 4 and means are provided for locking it in the desired position as hereinafter explained.

Each of the connector brackets 19 has spaced depending segmental portions 22 and 22′. The segmental portion 22 is provided with peripheral notches 23. The portions 22 and 22′ of each connector bracket extend between the arms of the associated bracket 10 and said arms are spaced apart sufficiently to allow for a lateral movement of the connector bracket segments between them, whereby any one of the notches 23 may be brought into and out of registry with a locking flange or lip 24 carried by the bracket 10. This lip 24 may comprise an inturned upper marginal portion of one of the bracket arms whereby, when in proximity to that arm, the segment 22 may be locked thereto by engagement of the lip flange 24 in one of its notches 23, whereas, when moved in the opposite direction the segment 22 may be disengaged to allow for a tilting adjustment of the visor shield 18.

Springs 26 are preferably coiled about the rod 20 between the unnotched flange 22′ of the connector bracket 19 and the adjacent arm of the bracket 10. The rod 20 is prevented from shifting laterally by cotter pins 29 and end nuts 30. Therefore the connector brackets 19 and the visor shield 18 may be shifted laterally with reference to the brackets 10 to an extent permissible by the spacing of the bracket arms and the degree of permissible compression of the springs 26. This shifting movement is sufficient to allow for a release and re-engagement of the connector bracket with the lip flange 24. It will, of course, be understood that the selected notch 23 which is brought in registry with the lip flange 24 will determine the inclination of the visor shield 18.

In order to allow for operation of any ordinary windshield wiper along the portion of the windshield covered by the visor, we have notched the inner margin of the visor shield 18, as clearly shown in Figure 3, thereby providing space for the windshield wiper, as shown at 32 in Figure 4. To prevent water from driving in against the windshield over the top of the visor and then flowing down through this opening 32, we employ a flexible rubber apron 33 of sufficient width to project upwardly along the outer surface of the windshield above the visor, the lower margin of this apron being forwardly turned and secured to the visor along its notched marginal portion by a connecting band 34 and bolts or screws 35 clearly shown in Figure 3.

To facilitate quickly releasing the visor for a downwardly tilting movement, we employ a rod 36 which extends through the tubular clamping bolt 11 and has its forward end provided with a yoke 37 which fits over a cross pin 38 connecting the two segments 22 of at least one of the connector brackets 19. By rotating the rod 36, the yoke 37 operates as an arm or lever to push the connector bracket 19 laterally. In one direction this lateral movement will release the visor from the locking lip flange 24, whereupon it will move downwardly by gravity or by air pressure and its movement may be controlled by the rod 36 and the pressure of the yoke 37 against the associated segment 22. The rod 36 is free to slide longitudinally in the guide or tubular bolt 11, and its position of longitudinal adjustment therein is normally determined by the engagement of the bracket segment 22 with the lip 24 on the relatively fixed windshield bracket 10. This arrangement makes it possible for the driver of the car to instantly lower the visor by merely rotating the rod 36 far enough to shift the visor laterally and release segment 22 from the bracket lip 24 and control the downward movement of the visor as above explained, until the desired adjustment is attained, whereupon a release of the pressure upon the segment, exerted by the yoke 37, will allow the visor to shift laterally to its normal position, thereby re-engaging the lip with one of the notches in the segment 22. To raise the visor, it is again shifted to release the segment, whereupon a push upon the rod 36 will be effective to swing the visor upwardly to the desired position. When the proper inclination is attained, a release of the pressure exerted by the yoke 37 will allow the springs 26 to re-engage the connector bracket with the associated lip flange 24,—this release taking place at a time when one of the notches 23 is in a position for registry with the lip flange. The yoke 37 may be used to adjust the connector bracket and visor laterally in either direction but the springs are preferably used to prevent rattling and to hold the visor normally locked in the position to which it has been adjusted.

To facilitate rotation or oscillation of the rod 36 as above described its inner end is provided with a suitable handle 40, preferably comprising a pair of flat bars clamped to the squared end of rod 36 or to a portion of the rod provided with a suitable keyway whereby the handle may be secured against rotation on the rod.

A visor constructed as above described will largely prevent water, snow, and sleet from lodging upon that portion of the windshield through which the driver of the car views the roadway. When used in connection with a windshield wiper even fog may be kept from this portion of the windshield and drifting or spattering portions of snow, rain or sleet may, of course, be removed. The visor may also be adjusted in a position to exclude the glare from the head lights of approaching vehicles until such vehicles are in close proximity, at which times the glare may also be excluded by a co-operative anti-glare shield on the inner side of the windshield, which anti-glare shield will now be described.

Owing to the presence of the visor 18 the driver will be able to exclude the glare of the approaching vehicle until the concentrated rays of the approaching head lamps pass underneath the visor. These concentrated rays may then be easily excluded from the driver's vision by a comparatively small translucent shield 42 which may be supported against the inner face of the windshield by a rod 43 which may be slidingly adjusted in a clamping member 44 pivoted to the clamping bolt 11, the clamping nut 12 being employed to apply the desired gripping pressure to the clamping member 44 to press the side thereof into engagement with the rod 43. By loosening the nut 12, rod 43 may be swung with the associated clamping member 44 for a rotative adjustment upon the bolt 11 and rod 43 may also be moved longitudinally in the clamping member 44 to lengthen or shorten the radius at which the anti-glare shield 42 is supported.

It will be observed that the anti-glare shield has its upper margin cut away in the direction of its outer or left-hand end (Figure 2),—the margin of this portion of the shield following a concavely curving line 45. This enables the driver to maintain clear vision across the left-hand side of the roadway in front of the head light beam of the approaching vehicle. It will of course be understood that the approaching head light beam intersects the glass of the windshield along an obliquely descending line progressively shifting to the left during the critical short period of time required for the vehicles to make their final approach toward each other after the approaching vehicle has reached a point where the rays of its head lamps pass under the visor 18 and before the position of the vehicles for final passage is completely determined. We have found by actual test that by reducing the area of the translucent anti-glare shield 42 by cutting away its upper margin along the concavely curved line 45, glare may be successfully excluded without any reduction in driving efficiency; the driver maintaining at all times a clear view of his own roadway and a lateral view of the portion of the roadway along which the approaching vehicle should travel.

Our attachment also accords convenient means for excluding condensation and frost from the inner surface of the windshield by a co-operative transparent or translucent plate 50, preferably composed of celluloid or a combination of celluloid and glass. This plate has its upper marginal portion apertured to receive the clamping bolts 11 and its margins may be covered with a thin strip of rubber 51 which may be resiliently stretched over the plate 50 so that its edges will turn inwardly between the plate and the windshield to form a packing and will also engage the inner surface of the plate on the side opposite the windshield for anchorage of the rubber strip. This anti-condensation shield 50 may thus be supported from the windshield without any additional fastening means and may be prevented from rattling by its marginal rubber packing. The visor is also prevented from rattling or vibrating by one or more flat springs 53 which may be secured to the under surface of the visor at 54 with their inner ends projecting over the yokes 37 and underneath the rod 20. The ends of this visor shield 18 are preferably provided with depending flanges 56 which progressively increase in width in the direction of the inner margin of the visor.

While we have illustrated our invention with two adjusting rods 36 and associated yokes 37, it will be understood that the position of the visor may be controlled by only one of these rods. If only one rod is employed, it may be located either in the left-hand clamping bolt 11 or in the right-hand clamping bolt to suit the convenience of the driver. Ordinarily, only downward adjustments of the visor will be made while the car is in motion and therefore we prefer to employ the notched segments 22 instead of utilizing gearing for that purpose. The segments 22 when in engagement with the lip flanges 24 hold the visor more securely and with less tendency to rattle than would be the case if inexpensive gearing were employed and it is necessary to have regard to the total cost of construction in order to attain commercial success.

We claim:

1. The combination with a vehicle windshield provided with suitable spaced apertures, of a set of clamping bolts extending through said apertures, clamping brackets supported by said bolts against the outer face of the windshield, a supporting rod connecting said clamping brackets, a visor pivoted to said supporting rod in the bracket supported portions thereof, means for interlocking the visor with one of the brackets by lateral movement of the visor, and means for moving the visor laterally from the inner side of the windshield.

2. A windshield visor mounted for adjustment angularly with respect to an associated windshield and having a notched inner margin adapted to permit operation of a windshield wiper underneath the visor from a point of support above it, and a flexible apron connected with the visor and normally bearing against the glass of the windshield above the notched portion of the visor.

3. The combination with a vehicle windshield, of a set of brackets supported in front of said shield, a visor pivotally connected with said brackets and normally locked to one of them, and visor adjusting means operable from the driver's seat, said means comprising a rod connected with the visor to support the weight thereof when the visor is unlocked from said bracket and provided with an arm inter-engaged with the visor to adjust it from locked to unlocked position, said rod being adapted by rotation to unlock the visor and also adapted by longitudinal movement to raise or lower the same.

4. The combination with a vehicle windshield, of means for supporting a visor in front of said shield, said supporting means being adapted to allow lateral shifting movements of the visor, and interlocking devices respectively connected with the visor and its supporting means, adapted to be engaged and disengaged by such lateral shifting movement, and means operable from the driver's seat for effecting said lateral shifting movement and for adjusting the visor to various degrees of inclination.

5. The combination with a vehicle windshield, of a set of visor supporting brackets, a visor pivotally connected with said brackets and laterally movable along its pivotal axis, a spring adapted to urge the visor in one direction along said axis, and a rotatable member, operable from the driver's seat for actuating it in the other direction, said visor and its supports being provided with interlocking members adapted to be normally brought into engagement by the pressure of said spring.

6. The combination with a vehicle windshield, of a set of tubular clamping bolts extending therethrough, brackets secured to the outer face of the windshield by the respective clamping bolts, a visor pivotally connected with said brackets and adapted for interlocking engagement therewith by lateral movement in one direction along the pivotal axis, a spring adapted to urge said visor toward such interlocking engagement, and an operating rod, extended through one of said tubular clamping bolts and provided with an arm loosely engaged with the visor and adapted, by oscillatory adjustment, to actuate the same in opposition to said spring.

7. The combination with a set of visor supporting brackets, of a visor having a set of brackets pivotally secured to the first mentioned brackets, a notched segment connected with one of the visor brackets, a projection on one of the windshield brackets adapted to engage selectively in the notches of the visor bracket, and means, controlled from the driver's seat, for effecting engagement and disengagement of the visor bracket with said projection, and for swinging the visor upon its pivotal connections to vary the inclination thereof.

8. In a windshield visor mechanism, the combination with a windshield glass plate provided with apertures, of a tubular bolt extending through the apertures and clamped to said plate, and a visor manipulating rod mounted for both sliding and rotative movements in the bolt, said rod having an exterior arm for shifting the visor laterally by rotation of the rod and also having a sliding pivotal connection with the visor to swing the latter in a vertical plane when the rod is moved axially.

9. The combination with an apertured glass windshield plate and an associated condensation plate, of a tubular bolt extending through the aperture and clamped to the plate, and provided with an exterior visor support, a visor adjusting rod extending axially through the bolt and axially and rotatively movable therein, the inner end of said bolt being formed to also support said condensation plate and glare excluding shield.

10. The combination with a vehicle windshield having a pair of spaced apertures, clamping bolts forming apertured supports extending through the windshield, a bracket for each of said supports, a visor pivotally supported from said clamping bolts by said brackets and adapted to swing to various positions of inclination in front of the windshield, means on the visor and on the support to interlock in one position and to disengage in another position of said means, said means being operable from the driver's seat for shifting the visor in one direction and adjusting it from one position to another of said interlock means.

11. The combination with a vehicle windshield having a pair of spaced apertures, tubular clamping bolts provided with exteriorly disposed brackets and extending through the apertures, a visor pivotally supported from said clamping bolts by said brackets and adapted to swing to various positions of inclination in front of the windshield, members on the bolts and on the visor to interlock and position the visor in different angles of inclination, and means extending through one of the clamping bolts to control the position of the visor as to inclination, said means being rotatable to disengage said members and longitudinally movable for swinging the visor to its various positions of adjustment.

12. The combination with a vehicle windshield having a pair of spaced apertures, tubular clamping bolts provided with exteriorly disposed brackets and extending through the apertures, a visor pivotally supported from said clamping bolts by said brackets and adapted to swing to various positions of inclination in front of the windshield, means for locking the visor in different positions of inclination, a rod freely reciprocable and rotatable through one of the clamping bolts to control the position of the visor as to inclination, said rod being provided with an arm adapted in the rotation of the rod to disengage said means to permit adjustment of the visor to various angles of inclination.

FRANCIS J. SCHMIDT, Jr.
CHARLES J. NASH.